United States Patent [19]
Lemelson

[11] 3,774,812
[45] Nov. 27, 1973

[54] MOLDED CONTAINER WITH INTERNAL SUPORT MEANS

[76] Inventor: Jerome H. Lemelson, 85 Rector St., Metuchen, N.J. 08840

[22] Filed: Feb. 3, 1972

[21] Appl. No.: 223,280

Related U.S. Application Data

[63] Continuation-in-part of Ser. No. 744,048, July 11, 1968.

[52] U.S. Cl. .................................. 222/211, 150/1
[51] Int. Cl. ............................................ B65d 37/00
[58] Field of Search ................... 222/464, 211, 107, 222/454, 456; 220/DIG. 12; 150/1; 264/271

[56] References Cited
UNITED STATES PATENTS
| | | | |
|---|---|---|---|
| 2,795,257 | 6/1957 | Cunningham | 150/1 |
| 3,347,401 | 10/1967 | Nataf | 222/211 X |
| 3,199,726 | 8/1965 | Pierson | 222/107 X |

*Primary Examiner*—Robert B. Reeves
*Assistant Examiner*—James M. Slattery

[57] ABSTRACT

A container is provided which is produced by rotationally molding a plastic material wherein an internal support is secured within the molding during the molding procedure. The support extends across the interior of the hollow molding and becomes integrally secured to the opposite walls thereof by molding. In one form, the support is a hollow rigid or flexible tubular member which is also utilized for dispensing the contents of the container.

In another form, the support is a flexible cable or wire or a plurality thereof, having its ends secured to opposite wall portions of the container by special fittings which are removeable secured to opposite walls of the mold cavity.

9 Claims, 5 Drawing Figures

PATENTED NOV 27 1973 3,774,812

MOLDED CONTAINER WITH INTERNAL SUPORT MEANS

RELATED APPLICATIONS

This is a continuation-in-part of application Ser. No. 744,048 filed July 11, 1968 for Composite Molding Apparatus, Method and Article Produced Therefrom.

SUMMARY OF THE INVENTION

This invention relates to new and improved structures in product containers such as large drum-shaped containers for liquids and flowable solid materials which are produced by rotational molding suitable plastics in a closed mold. It is known in the art to rotationally mold large hollow bodies by disposing a quantity of a thermo-plastic or thermo-setting resin in a closed mold, which quantity is substantially less than the volume defined by the mold cavity, the moving the mold in such a manner as to distribute the plastic about the surface of the mold cavity wall on which it is caused to solidify into such hollow body. The procedure has been utilized to produce such articles as toys, furniture and containers. Heretofore, the production of containers by rotational molding has been somewhat limited which is primarily due to the cost of the amount of resin required to fabricate such containers having wall thicknesses which are sufficient to support the container without appreciable deformation, when filled. Thus, relatively large containers, say 50 to 500 gallon capacity, have not generally been produced by rotational molding as a result of the cost of material and the inability of such large containers to retain their shape without buckling or permanently deforming under loads imposed when they are filled with a product.

The instant invention is primarily concerned with new and improved structures in large hollow bodies which are particularly applicable in the fabrication of large containers such as industrial shipping and storage containers for liquid chemicals and flowable bulk material.

It is accordingly a primary object of this invention to provide new and improved structures in large hollow bodies, such as product containers, which are produced by rotational molding and contain internal support means which are integrally secured to the hollow body during the molding procedure.

Another object is to provide a structure in a container produced by rotational molding having one or more internal support members extending completely across the hollow body and united to the opposite walls thereof during the molding procedure.

Another object is to provide a large, hollow molded body formed by rotational molding and containing a tubular member extending across the hollow body and secured to opposite walls thereof for supporting the hollow body, which tubular member is also operable to receive or dispense fluid materials from the container.

Another object is to provide a container assembly having a large, relatively thin, flexible wall and having integrally secured thereto by molding, one or more flexible cables to prevent excessive deformation of the flexible wall when the container is filled.

Another object is to provide improved structures in fittings for anchoring flexible wire rope and the like against opposite walls of a large, hollow body, during the molding procedure and in such a manner as to be retained in assembly with the molded body upon completion of molding.

With the above and such other objects in view as may hereinafter more fully appear, the invention consists of the novel constructions, combinations and arrangements of parts as will be hereinafter more fully described and illustrated in the accompanying drawings wherein are shown embodiments of the invention, but it is to be understood that changes, variations and modifications may be resorted to which fall within the scope of the invention as claimed.

Figure 1:
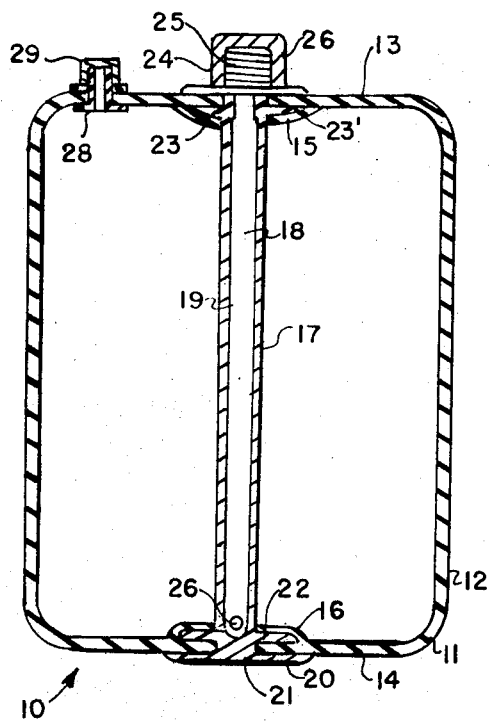
FIG. 1 is a side cross sectional view of a container formed by rotational molding and having an elongated tubular member extending between the opposite end walls of the container and secured thereto by molding, for supporting the container and serving as a dispensing means for the contents of the container.

There is shown in FIG. 1 a container assembly 10 formed of a large hollow body 11 having a circumscribing side wall 12 which extends and is joined to end walls 13 and 14. Extending longitudinally through the interior of the container and secured to the opposite end walls 13 and 14 is a tubular member 18 forming part of an assembly 17 which includes fittings 20 and 23 which are respectively secured to the end walls 14 and 13. The fittings and the tubular member may comprise an assembly of elements or may be a unitary molding or casting. The tubular member 18 may be rigid metal or plastic or may comprise a flexible plastic of the same or different material of which the molded body 11 is made. If the tubular member 18 is a flexible plastic and the body 11 is molded of flexible plastic such as plasticiized polyvinyl chloride medium or low density polyethylene or polyurethane resin which is rotationally molded to shape, then the container may be collapsed when it is empty so as to occupy less volume during shipment.

The tubular member 18 is shown having one or more holes 26 at the lower end thereof through which a liquid may flow in either direction during the pressurized filling or dispensing of said liquid from the container. A second fitting, denoted 28 may also be provided in the end wall 13 which may contain a valve or cap 29 to be opened during the dispensing procedure to allow air to enter the container or to pressurize the contents with a pressurized gas to force liquid through opening 26 up tube 18 and out the neck 25 which is an extension of the assembly 17.

The tubular assembly 17 includes a plurality of spaced-apart flanges 23' and 24 near the upper end thereof and spaced-apart flanges 21 and 22 at the lower end thereof. The fitting 20 at the lower end is secured within a sub-cavity in the mold wall while the fitting at the upper end is secured within a sub-cavity in the opposite wall of the mold which sub-cavity inclues means for receiving the threaded neck 25 of that fitting. During the molding procedure, molding material flows and is solidified against the outer surfaces of the flanges 22 and 23 and spaces between the adjacent pairs of flanges as illustrated. Notation 15 refers to solidified molding material extending over the flange 23' and integrally formed with the end wall 13. Notation 16 refers to molding material extending over and around the flange 22 and integrally formed with the end wall 14 of the hollow body 11. As a result, the fittings at the opposite ends of the container are locked within the portions 13, 15 and 14, 16 of the molding and securely retain said fittings and the tube assembly 17 in assembly with the hollow body 11.

During the molding procedure, molding material may be introduced through the passageway 19 defined by the tubular member 18 by causing it to flow through the neck 25 from a pressurized supply of such material whereby it enters the mold cavity through one or more of the openings 26. Using such a technique, a plurality of different molding materials may be introduced into the mold cavity during the molding procedure to form a composite walled hollow body 11 or a single material may be introduced either in one charge or as a plurality of different charges to form the hollow body. If the material forming the hollow body is heat curable, a hot gas may be introduced through one or more openings such as 26 in the wall of the tubular member 18 to rapidly heat cure the plastic as it is distributed about the interior of the mold. If the material being molded is a thermoplastic resin, it may be rendered molten within the mold by heat transferred through the wall of the mold and a hot gas injected through the passageway 19 of the tubular member 18 into the mold through the openings 26 and made to circulate through the volume defined by the interior of the hollow body and be removed either through the same openings or other openings in the tubular member 18. Thereafter, a cold gas, refrigerant or liquid contents for the container may be injected through one or more openings in tubular member 18 and circulated or merely flowed through the interior volume of the container to complete the solidification of the plastic formed against the wall of the mold cavity and defining walls 12, 13 and 14 of the container.

The tubular member 18 may comprise steel or aluminum tubing secured to suitable end fittings for providing a rigid longitudinal support for the container while the flanges of the end fittings may extend completely or substantially across and, in certain instances, define most of the end walls of the container. If the tubular member 18 is made of a flexible plastic such as flexible polyurethane resin, or other suitable resin, and may be buckled without permanently deforming, the entire container may be longitudinally collapsed to bring the end walls 13 and 14 close together and not in contact with each other so as to permit shipping of the container in a fraction of its volume. It may also be collapsed in a lateral direction to buckle the end walls and permit the side walls to be compressed together into a relatively flat shape.

Figure 2:
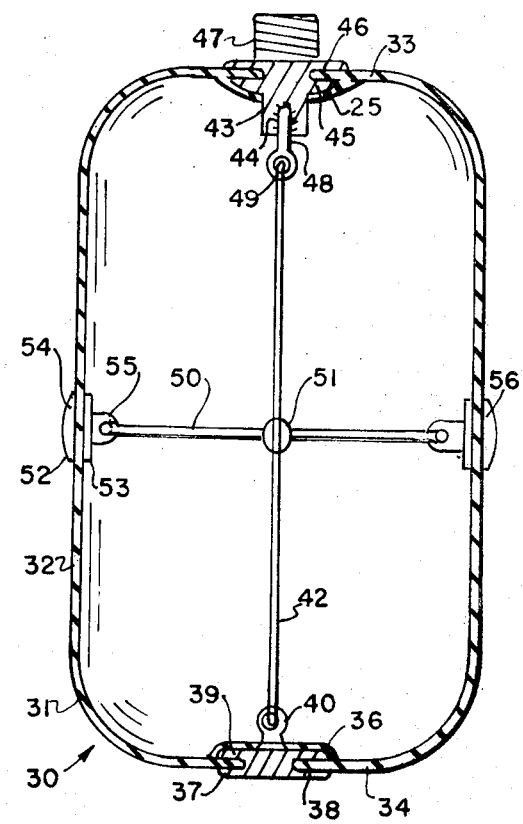
FIG. 2 is a side cross sectional view of a large hollow container having a plurality of flexible members such as wire ropes extending across and secured to opposite walls of the container for supporting the container when filled.

In FIG. 2 is shown a modified form of the invention wherein the tubular member of FIG. 1 is replaced by a longitudinally extending flexible wire or rope 42 which is anchored at its opposite ends by fittings secured to the opposite end walls of the container. The assembly 30 is composed of a hollow body 31 having a circumscribing side wall 32 which is molded integral with end walls 33 and 34, preferably by rotationally molding a suitable thermo-plastic or thermo-setting resin in a mold across the cavity of which extends one or more wires or cables secured to opposite walls by special fittings. The fittings become part of the eventual assembly and are integrally secured to the opposite walls of the molding 31 during the molding procedure by techniques and structures of the types defined in FIG. 1.

Secured to the lower end wall 34 of container 30 is a first fitting 37 composed of a pair of spaced-apart flange portions 38 and 39 between which an extension of the material of the end wall 34 is solidified. Molding material 39 is shown extending over and around the upper flanged portion 39 and is integrally molded with the material of the end wall 34 to encapsulate the flange portion 39 therebetween. Extending upwardly and into the interior of the container from the central portion of the fitting 37 is an eye-shaped connector 40 holding the end of the flexible wire or rope assembly 41 for anchoring same at the lower end of the container. The upper fitting 43 is composed of a pair of spaced-apart flange portions 45 and 46 extending from a lower tubular portion 44 and an upper tubular portion 47 which is externally threaded to receive a threaded closure as in FIG. 1 and serves as a dispensing neck through which material may be flowed into or out of the container. Molding material 25 extends over and around the lower flange 45 of the fitting 43 securing the fitting to the end wall 33 of the molding 31. Welded or integrally formed as an extension of the lower tubular portion 44 of the fitting 43 is a shank 48, containing a loop or eye-shaped receptacle 49 at its end through which is looped and secured the upper end of the wire or rope 42 of the wire assembly 41 to secure the wire longitudinally across the interior of the container.

If the fittings 37 and 43 of FIG. 2 as well as their equivalents in FIG. 1 are made of metal such as aluminum or steel, and the material comprising the hollow body 31 is a thermo-plastic material adapted to be rendered molten by heat, and to be cooled by transferring heat therefrom through the wall of the mold, then heat may be transferred from the surfaces of the mold sub-cavity in which the fittings are secured through said fittings to the molding material disposed against the inner fittings to render same molten after which heat may be transferred therefrom back through the fitting to the mold wall when the mold is cooled by passing heat transfer liquid through passageways therein or against the mold wall. If the molding material is a thermo-setting resin such as a vinyl plastisol, then heat may be transferred through the fittings attached to the opposite mold walls for causing the molding material coated against the inner flange portions thereof and between the flanges to set or solidify.

Also shown in FIG. 2 is a second flexible cable 50 extending between and supported at its ends by fittings 52 and 56 which are secured to portions of the opposite sides of the circumscribing side wall 32 of the container. The fittings 52 and 56 are similarly shaped. Fitting 52 contains an inner flange 53 and an outer flange or head 54 between which flanges molding material flows and is solidified. Connected to the central portion of flange 53 is a bracket or eye 55 adapted to receive and secure and end of the cable 50. The other end of cable 50 is secured to a similar eye or bracket forming part of the fitting 56. Notation 51 refers to a retainer secured to the central portions of cables or wires 42 and 50 retaining a relationship between the two.

It is noted that a plurality of cables extending diagonally across the hollow molding 31 may also be employed in addition to those illustrated in FIG. 2 or in replacement therefore. In other words, one, two or several or more flexible lines may be tensionally secured to opposite walls of the container during the molding process as described for suitably supporting the container when full yet permitting it to be collapsed either longitudinally or laterally on itself to permit the container to be shipped in a fraction of its open or full volume.

Figure 3:
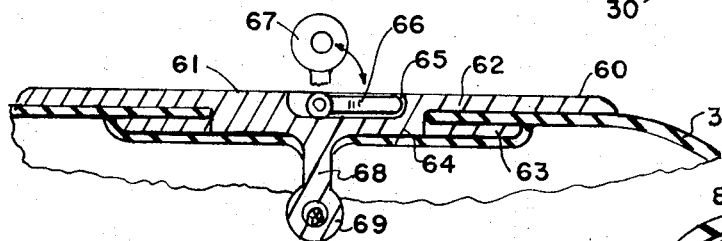
FIG. 3 is a cross sectional view of a fragment of one end of a rotationally molded container showing details of a fitting which integrally secured by molding to the end wall and which retains an internal fitting for holding the end of a wire or rope support extending into the container and an external, retractable fitting for holding the container from above.

FIG. 3 illustrates a modified form of end fitting for the bottom end of a container of the type shown in FIG. 2. The fitting assembly 60 has a central portion 61 with a cavity 65 extending therein from its outer surface and extending to an outer flange 62 which is spaced apart from an inner flange 63. The end wall of the container extends between the two flanges and the inner flange 63 is encapsulated between said end wall and molding material extending thereover as illustrated and previously described. Pivotally secured within the cavity 65 is a retainer 66 having a ring or eye-shaped portion 67 which may be retracted flat therein or pivoted outwardly to permit a hook on the end of a cable to extend through the eye for suspending the container assembly from above. Extending downwardly from the central portion 64 of the fitting 61 is a shank 68 containing an eye or ring shaped formation 69 at its end through the opening of which extends one end of cable 42 which is secured thereto by a knot or its own fitting.

Figure 4:
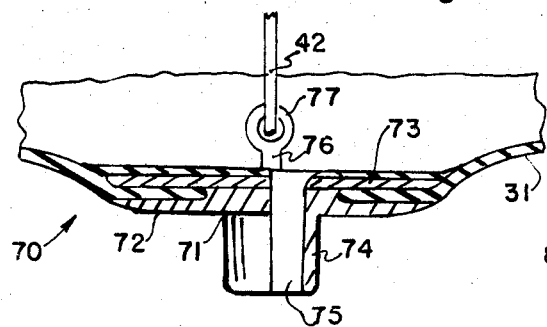
FIG. 4 is a cross sectional view of a portion of the other end of the container of FIG. 3 showing a fitting which is integrally secured to the end wall by molding and contains a dispensing neck and a support for the other end of the wire rope of FIG. 3 extending through the container.

In FIG. 4, a modified form of container assembly 70 includes a fitting 71 integrally secured by molding, as described, to the end wall of the hollow container body 31. The fitting 71 has an outer flange 72 extending from a tubular dispensing or filling neck 74 and an inner flange 73 which is spaced apart from flange 72. Molding material is shown integrally molded between the two flanges and extending over the upper flange 73 to secure the fitting 71 in place by molding. Welded or extending integral with the central tubular neck 74 is a shank 76 having a ring 77 formed at its end for securing the end of cable 42 thereto. Notation 75 refers to a passageway extending through tubular neck 74 which permits flow of the contents of the container downwardly out of the container when the container is up-ended and held by the ring fitting 67 at its upper end as shown in FIG. 3. The length of cable 42 extending between fittings 60 and 71 is preferably such that the container side wall will not be stretched beyond its elastic limit when it is full and is longitudinally held by the eye 67 of the fitting 60 from above. The exterior surface of the tubular neck 74 may be threaded as shown in FIGS. 1 and 2 to receive a closure which may be retained thereon until it is desired to dispense material from the container. Such closure may also include a valve which may be manually or remotely controlled to dispense selected amounts of material from the container when it is held in an up-ended condition as defined in FIGS. 3 and 4.

Figure 5:
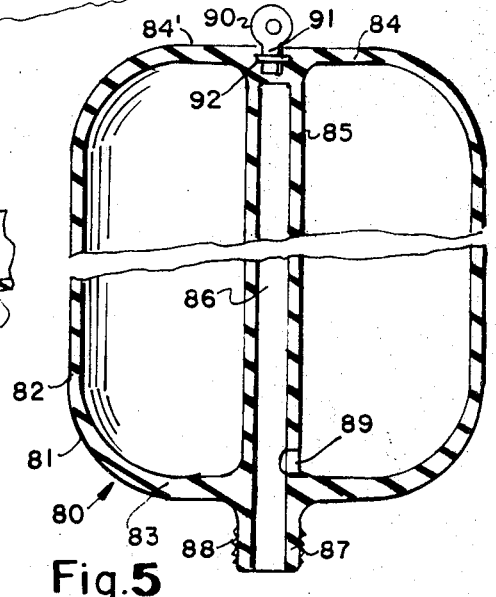
FIG. 5 is a side cross sectional view through the axis of a modified form of container.

In FIG. 5 is shown another structure in a container 80 which is formed by rotational molding and has a tubular member formed during molding and extending between opposite end walls 83 and 84 thereof which are integrally formed with a circumscribing side wall 82.

Molded integral with the end walls 83 and 84 is a tubular section 85 extending between the two and formed of the same material of which the side and end walls is formed, by rotational molding. Extending outward from the end wall 83 in alignment with tubular portion 85 is a neck portion 87 having its exterior surface 88 threaded to receive a closure.

An eye bolt 90, having a shank 91 with a flange 92 extending therefrom, is secured to the end wall 84 by molding and provides means for holding the container from above. The eye bolt 90 may, of course, be eliminated if it is not desired to hold the container from above as in FIG. 3. or may be recessed in wall 84.

The container 80 of FIG. 5 may be produced by providing a rod or pin extending between opposite walls of the mold cavity, around which rod or pin molding material is caused to coat and to solidify thereon during the molding procedure. After removing the molding and rod from the mold, the rod may be removed from the molding by pulling it out of its tubular receptacle 85 leaving such tubular formation which may be used to longitudinally support the hollow body 81 and for filling and dispensing purposes after one or more openings are drilled or punched through a selected portion of the wall of said tubular formation by means of a special tool. The tool may comprise a rod or tube which is heated to soften the material of the wall of 85 and a gas under pressure may be ejected therefrom as a stream to form a hole in the wall of tubular formation 85 to permit material to flow through the passageway 86 in the tubular formation in filling or dispensing said material from the container. The container of FIG. 5 is shown with its axially molded tubular formation 85 having a hole 89 formed in said tubular formation just below the end wall 83 containing the dispensing neck 87 so that when the container is upended, as shown, for dispensing its contents through the neck, substantially all the contents thereof may be dispensed.

The neck 87 of container 80 may be modified in shape, made of another material such as metal and secured to the end wall 83 by molding material of the end wall thereover, staking or welding same in place, or may be eliminated and replaced by an internally threaded fitting or bore, a friction held or welded-on cap or other form of closure or valve.

The flanged eye bolt 90 of FIG. 5 may be totally recessed within a cavity molded in the end wall 84 to permit the container 80 to stand on its bottom wall or may be pivotally retractable as in FIG. 3. Said eye bolt may also be lineally movable within a cylinder which is molded into and retained by the end wall 84 or extends into passageway 86 and is bonded or welded to the inside wall surface thereof to retain it in place. As such the eye bolt may be retracted to permit the bottom surface 84' of the container to rest flush on the floor or ground and pulled out to permit the container to be hung on a hook from above. The eye bolt and cylinder may also define a vlave for venting air into the container when the bolt is pulled out to facilitate emptying of the container of its contents.

In the construction illustrated in FIG. 5, the enclosure 81 is shown with its end walls 83 and 84 substantially thicker than the thickness of the circumscribing side wall 82, a structure which may be derived by rotating the mold in which the container is molded about an axis which is normal to the longitudinal axis of the tube 85 for a time interval which is greater than the time alotted for rotation about the longitudinal axis of the tubular formation. By providing such a construction, the amount of plastic utilized in the side wall 82 may be substantially reduced with longitudinal support being derived from the tubular formation 85 to prevent excess longitudinal stretching of the side wall. The containers of FIGS. 1 to 4 may also be produced with palstic material forming the end walls thereof being of greater thickness than the material forming the side walls to provide sufficient strength and coverage for the molded-in end fittings.

In addition to be fabricated of flexible resins such as polyethylene, polyvinyl chloride, ethylene vinyl acetate and styrene butadiene plastics containers of the type shown in FIG. 5 may also be fabricated of more rigid resins such as acetyl, linear polyethylene, rigid vinyl and other resins wherein the tubular formation may serve primarily as a duct for liquid contents to be dispensed through the neck under pressure. For example, the container may be used as an aerosol dispenser with a valve sealed to the neck 87 and an opening formed by drilling, punching or hot blowing provided through tubular formation 85 at the end thereof which is adjacent end wall 84 thus providing means for dispensing the contents from the bottom of the container. While formation 85 may be used to eliminate need for a separate dispensing tube such a tube may also be provided within said tubular formation at the end of a valve disposed in the neck 87.

In yet another form of the invention, it is noted that the side wall of containers such as those shown in FiGS. 1 to 5 may be made of flexible resin by introducing a predetermined quantity of such resin into a mold and rotating the mold about the container's longitudinal axis until all the resin has been solidified against the side wall of the mold cavity after which a first charge of a more rigid resin is introduced through a nozzle or tube such as 18 of FIG. 1 while one of the end wall defining surface of the mold cavity is bottom-horizontal so that the more rigid resin settles and may be solidified in situ thereon to form one end wall integral with the flexible side wall. Thereafter the mold is upended to provide the other end wall defining wall portion of the mold cavity bottomed and horizontal wherein a second charge of the more rigid resin is admitted and caused to solidify against said bottomed wall to from the other more rigid end wall of the container. Or the more rigid end walls may be formed by rotating the container forming mold about an axis which is normal to the longitudinal axis of the container to disposed most of the rigid resin against the top and bottom wall forming surfaces of the mold cavity.

In another form of the invention, it is noted that wall reinforcing means may be disposed against those portions of the mold wall cavity employed to form the side wall of the container as well as the end wall forming cavity walls to become an integral part of the molding. For example, individual rods or strips may be supported within elongated subcavities in the mold wall by friction and shaped so as to become attached to the molded container wall when molding material is solidified thereagainst during molding. T, channel or angle shaped strips of plastic or metal extrusions may also be frictionally retained or pinned to portions of the mold wall to become integrally secured at least partially within the molded container wall. A shaped screen or lattice-like reinforcing structure may also be supported against or just off the mold cavity wall partly or completely therearound by means of frictionally retained pins held in holes in the mold cavity wall to become partly or completely encapsulated within the molded container wall and to serve as reinforcing means therefore.

I claim:

1. A container comprising:
    a hollow body having a relatively thin side wall portion joined to end walls and formed of a polymeric material by molding,
    a first fitting for dispensing material from said container, said first fitting being integrally secured to an end wall of said hollow body,
    an elongated flexible member substantially smaller in diameter than the cross-section of said hollow body and extending between said end walls of said body and connected at one end to said first fitting,
    a tube extending into the interior of said hollow body and supported by said first fitting,
    an opening in said tube within said hollow body through which material may be flowed to fill and be dispensed from said container, and
    a second fitting integrally secured to the other end wall of said container, said elongated flexible member being secured to said second fitting,
    one of said fittings having space-separated flanges with at least one of said flanges secured by molding within a portion of the end wall of said container to which it is attached.

2. A container in accordance with claim 1 wherein said elongated flexible member comprises a tube connected to said first fitting and extending completely across said hollow body and joined at its other end to said second fitting, said tube serving to support the side wall portion of said hollow body against deformation when the container is filled.

3. A container in accordance with claim 2 wherein said tube is flexible and tensionally supports said end walls when the container is filled and hung from above.

4. A container in accordance with claim 3 wherein said tube may be buckled when the container is empty or being emptied to permit the end walls of the container to be brought closer together.

5. A container in accordance with claim 2 wherein said tube is integrally molded of the material comprising said hollow body.

6. A container formed by molding having a circumscribing side wall molded integral with end wall portions of a flexible plastic material and defining a unitary enclosure wherein said side wall may be easily collapsed inwardly when the container is empty, a first fitting having a flange portion, said flange portion of said first fitting being embedded within a portion of a first of said end wall portions of said container to fixedly retain said fitting to said first end wall portion, a second fitting having a flange portion, said flange portion of said second fitting being embedded within a portion of the wall of the other end-wall portion of said container opposite that in which said first fitting is secured, and an elongated flexible member extending within said container between the end walls thereof, said elongated flexible member being secured at each of its ends respectively to said first and second fittings and serving to internally support the side wall of said container against longitudinal deformation when a material is disposed within said container and the container is held with its side wall disposed vertically.

7. A container in accordance with claim 6 wherein each of said fittings secured to the end wall portions of said container is provided with a plurality of space-separated flanges, one of which is embedded within the end wall to which the fitting is secured while the other of said flanges is disposed externally of said end wall.

8. A container in accordance with claim 6 including a second elongated flexible member extending between opposite portions of the side wall of said container, third and fourth fittings having respective flange portions moldably secured to respective portions of the opposite side walls of said container, said second elongated flexible member being secured at its ends to said third and fourth fittings and operable to restrain the lateral deformation of the side wall of said container when a material is disposed therein.

9. A container in accordance with claim 8 including means for securing said first and said second elongated flexible members together between the ends thereof within said container.

* * * * *